US010843766B2

(12) United States Patent
Kogirima et al.

(10) Patent No.: US 10,843,766 B2
(45) Date of Patent: Nov. 24, 2020

(54) STRADDLE VEHICLE

(71) Applicant: KAWASAKI JUKOGYO KABUSHIKI KAISHA, Kobe (JP)

(72) Inventors: Masato Kogirima, Kobe (JP); Daisuke Saeki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 189 days.

(21) Appl. No.: 16/106,572

(22) Filed: Aug. 21, 2018

(65) Prior Publication Data

US 2019/0092423 A1 Mar. 28, 2019

(30) Foreign Application Priority Data

Sep. 22, 2017 (JP) .................. 2017-182815

(51) Int. Cl.
| | |
|---|---|
| *B62K 25/28* | (2006.01) |
| *B62K 25/02* | (2006.01) |
| *B62K 25/00* | (2006.01) |
| *B62K 25/20* | (2006.01) |

(52) U.S. Cl.
CPC .......... *B62K 25/283* (2013.01); *B62K 25/005* (2013.01); *B62K 25/02* (2013.01); *B62K 25/20* (2013.01); *B62K 25/286* (2013.01)

(58) Field of Classification Search
CPC ......... B62K 25/02; B62K 25/10; B62K 25/20
USPC ................ 180/227; 301/110.5, 124.1, 124.2
See application file for complete search history.

(56) References Cited

U.S. PATENT DOCUMENTS

| | | | | |
|---|---|---|---|---|
| 4,782,908 A | * | 11/1988 | Trema .................. | B62K 25/283 180/226 |
| 4,794,998 A | * | 1/1989 | Iwai ...................... | B62K 25/005 180/219 |
| 4,880,280 A | * | 11/1989 | Panzica .................. | B62K 25/02 301/110.5 |
| 4,889,205 A | * | 12/1989 | Yoshimi ............... | B62K 25/005 180/227 |
| 10,112,677 B2 | * | 10/2018 | Ishii ....................... | B62K 25/04 |
| 2005/0052072 A1 | * | 3/2005 | Schlanger ............. | B60B 27/023 301/110.5 |

(Continued)

FOREIGN PATENT DOCUMENTS

| | | |
|---|---|---|
| JP | S61143274 A | 6/1986 |
| JP | H05-45476 B2 | 7/1993 |

*Primary Examiner* — Tony H Winner
(74) *Attorney, Agent, or Firm* — Alleman Hall Creasman & Tuttle LLP

(57) ABSTRACT

A straddle vehicle comprises an axle; an external member which is externally fittable to the axle; and a fastening member fastened to the axle to prevent disengagement of the external member. The axle includes an outer tube member to which the external member is externally fittable, and an inner shaft member which is inserted into the outer tube member and is longer in an axial direction of the axle than the outer tube member. The inner shaft member includes a shaft part which is internally fittable to the outer tube member, a male thread part formed in an outer peripheral surface of a first end portion of the shaft part, and a retaining part protruding radially outward from a second end portion of the shaft part, the retaining part being configured to retain an axial tension of the inner shaft member generated by fastening the fastening member to the axle.

7 Claims, 4 Drawing Sheets

(56) References Cited

U.S. PATENT DOCUMENTS

2009/0008987 A1* 1/2009 Hoogendoorn ..... B60B 27/0052
  301/110.5
2013/0241271 A1* 9/2013 Lim ..................... B62K 25/02
  301/124.2

* cited by examiner

STRADDLE VEHICLE

CROSS-REFERENCE TO THE RELATED APPLICATION

This application claims priority to and the benefit of Japanese Patent Application No. 2017-182815 filed on Sep. 22, 2017, the entire disclosure of which is incorporated herein by reference.

BACKGROUND OF THE INVENTION

Field of the Invention

The present invention relates to a straddle vehicle having a configuration in which a fastening member is fastened to an axle of a drive wheel.

Description of Related Art

As an example of a swing arm mounted on a motorcycle, Japanese Examined Application Publication No. Hei. 5-45476 discloses a cantilever swing arm which extends through only one side of a rear wheel and supports the center portion of an axle. In this disclosure, the rear end portion of the swing arm supports the axle by a bearing, rotational driving power is transmitted from a prime mover (driving power source) to the axle via a damper device mounted on the axle, and a wheel hub of the rear wheel is supported by the axle in such a manner that the wheel hub is rotatable together with the axle. The wheel hub is retained between a protruding part of the axle which positions the bearing in an axial direction of the axle and a nut fastened to the axle.

However, in the above-described configuration, parts such as the nut with an intricate shape and a wire are provided to prevent the nut from getting loose, with acceleration/deceleration of the wheel. This increases cost of the parts.

SUMMARY OF THE INVENTION

In view of the above-described circumstances, an object of the present invention is to provide a configuration which can prevent looseness of a fastening member fastened to an axle of a drive wheel which is supported by a cantilever swing arm, at low cost.

According to an aspect of the present invention, a straddle vehicle comprises: an axle of a drive wheel; an external member which is externally fittable to the axle; and a fastening member having a female thread part fastened to the axle to prevent disengagement of the external member from the axle, wherein the axle includes an outer tube member to which the external member is externally fittable, and an inner shaft member which is inserted into the outer tube member and is longer in an axial direction of the axle than the outer tube member, wherein the inner shaft member includes: a shaft part which is internally fittable to the outer tube member, a male thread part formed in an outer peripheral surface of a first end portion of the shaft part, the first end portion protruding to a first side in the axial direction from the outer tube member, the female thread part of the fastening member being fastened to the male thread part, and a retaining part protruding radially outward from a second end portion of the shaft part, the second end portion protruding to a second side in the axial direction from the outer tube member, the retaining part being configured to retain an axial tension of the inner shaft member which is generated by fastening the fastening member to the axle.

In accordance with the above-described configuration, in a case where the external members (e.g., an eccentric unit which is internally fitted to the end portion of a swing arm, a wheel hub of a wheel, and a driving power transmission device which transmits driving power from a traveling driving power source to the wheel) which are externally fitted to the axle are retained and tightened between the retaining part of the inner shaft member and the fastening member, a fastening distance between the retaining part and the fastening member is longer in the axial direction of the axle than the length of the outer tube member. In this structure, it becomes possible to secure a sufficient space in (distance over) which the inner shaft member can be elastically extended and contracted in the axial direction, by a fastening force generated between the retaining part of the inner shaft member and the fastening member (it becomes possible to secure a sufficient elastic extension/contraction capability of the inner shaft member in the axial direction, which occurs by the fastening force generated between the retaining part and the fastening member). The axial tension generated in the inner shaft member by fastening the fastening member to the axle is easily maintained by sufficient elastic extension/contraction. As a result, it becomes possible to prevent the fastening member from getting loose, with a simple structure. Since the axle includes separate members which are the outer tube member having a driving power transmission function and the inner shaft member having a fastening function, it becomes possible to prevent the looseness of the fastening member fastened to the axle supported by a cantilever swing arm, at low cost, without providing a complex looseness prevention mechanism.

The inner shaft member may have a tubular shape.

The inner shaft member with the tubular shape is more easily elastically extended and contracted in the axial direction, than an inner shaft member with a solid structure. The inner shaft member with the tubular shape makes it possible to easily generate the axial tension by fastening the fastening member to the axle. Thus, it becomes possible to suitably prevent the fastening member from getting loose.

The inner shaft member may have a thickness smaller than a thickness of the outer tube member.

In accordance with this configuration, the axial tension of the inner shaft member is easily generated by fastening the fastening member to the axle, while maintaining a sufficient strength of the outer tube member with respect to a rotation. In this way, the strength of the axle and prevention of the looseness of the fastening member can be achieved.

The straddle vehicle may further comprise: a pair of collars disposed between the external member and the inner shaft member, both end edges in the axial direction of the outer tube member may be located inward in the axial direction relative to outer both end edges in the axial direction, respectively, of the external member, and at a location that is outward of the outer tube member in the axial direction, each of the pair of collars may include a tubular part located between an inner peripheral surface of the external member and an outer peripheral surface of the inner shaft member.

In accordance with this configuration, since the tubular part of each of the pair of collars is sandwiched between the inner peripheral surface of the external member and the outer peripheral surface of the inner shaft member, the center axis of the inner shaft member conforms to the center axis of the outer tube member without a need to sealingly fit the inner shaft member to the outer tube member. With this structure, the outer diameter of the inner shaft member can be made smaller than the inner diameter of the outer tube member. This makes it possible to easily mount the inner shaft member to the outer tube member, and easily adjust a spring constant of axial extension/contraction of the inner shaft member.

Each of the pair of collars may further include a flange part protruding radially more outward than the inner peripheral surface of the external member, and the retaining part of the inner shaft member and the fastening member may press flange parts of the pair of collars, respectively, from an outer side in the axial direction.

In accordance with this configuration, the collars serve as washers for the retaining part and the fastening member.

In a state in which the retaining part of the inner shaft member and the fastening member press the flange parts of the pair of collars, respectively, a clearance may be formed between the tubular part of each of the pair of collars and the outer tube member in the axial direction, and each of the retaining part and the fastening member may have an outer diameter larger than an outer diameter of the tubular part of each of the pair of collars.

In accordance with this configuration, since the outer diameter of each of the fastening member and the retaining part is larger than the outer diameter of the tubular part of each of the pair of collars, a pressing force in the axial direction which is applied by the retaining part of the inner shaft member and the fastening member is received by the external member via the flange parts. Therefore, even in a case where the clearances for a tolerance are provided between the tubular parts of the pair of collars and the outer tube member in the axial direction, it becomes possible to prevent a situation in which the collars are deformed and the tubular parts are moved to eliminate these clearances.

The above and further objects, features and advantages of the present invention will more fully be apparent from the following detailed description of a preferred embodiment with reference to the accompanying drawings.

DETAINED DESCRIPTION OF THE PREFERRED EMBODIMENTS

Hereinafter, the embodiment of the present invention will be described with reference to the drawings. The stated directions are from the perspective of a rider straddling a motorcycle.

Figure 1:
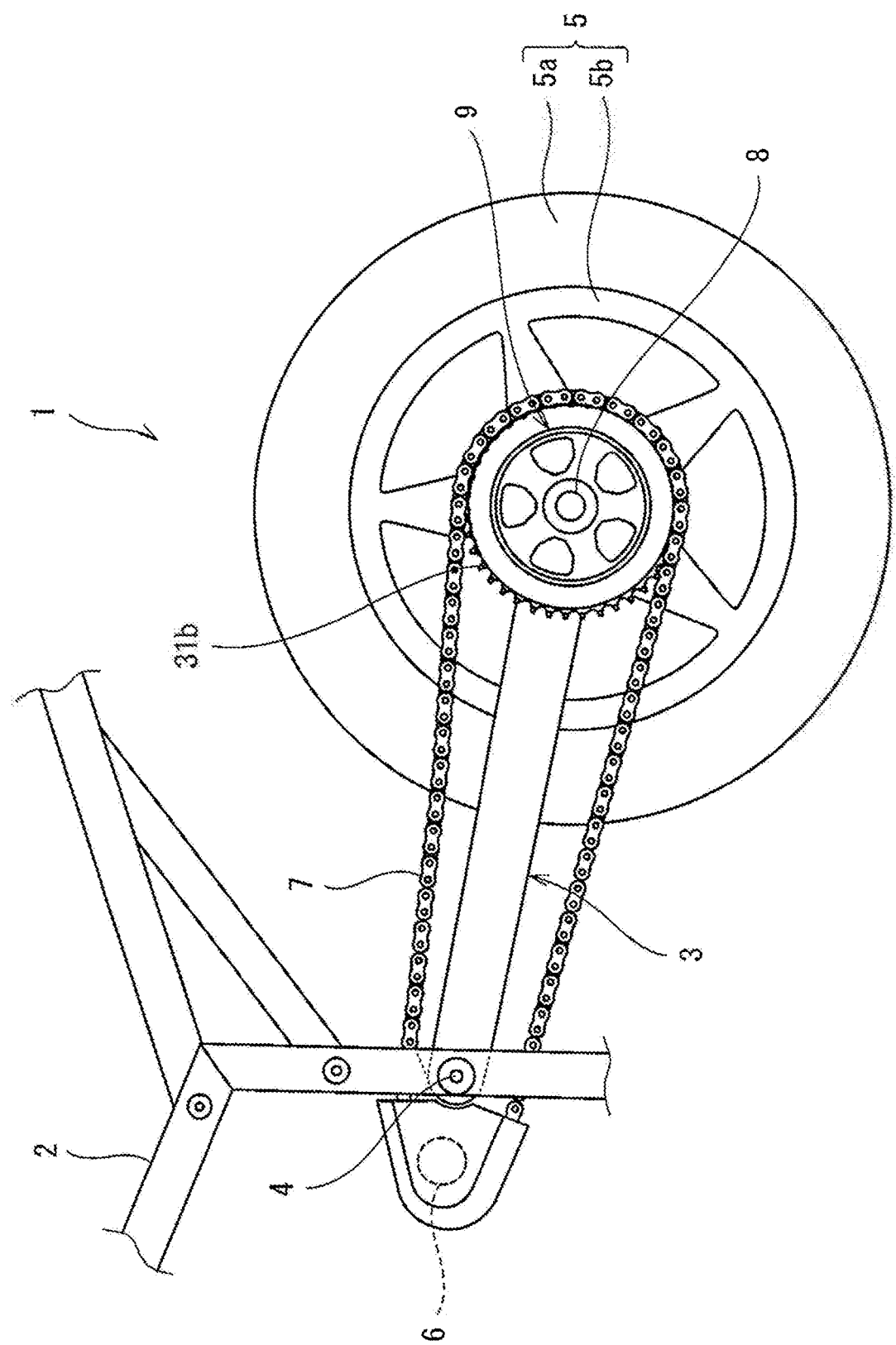
FIG. 1 is a left side view of the rear portion of a motorcycle according to an embodiment.

FIG. 1 is a left side view of the rear portion of a motorcycle 1 according to an embodiment. Referring now to FIG. 1, the motorcycle 1 which is an example of a straddle vehicle is shown. The front end portion of a swing arm 3 extending substantially in a forward and rearward direction is supported by a vehicle body frame 2 in such a manner that the swing arm 3 is rotatable around a pivot shaft 4. A rear wheel 5 (drive wheel) is rotatably supported by the rear end portion of the swing arm 3. A driving power source (e.g., an engine or a motor) which is not shown and a transmission coupled to the driving power source are mounted on the vehicle body frame 2. Rotational driving power output from an output shaft 6 of the transmission is transmitted to the rear wheel 5 via an endless driving power transmission loop 7 (e.g., a drive chain or a drive belt). A damper device 9 (a driving power transmission device) is connected to an axle 8 of the rear wheel 5. The damper device 9 includes a driven part 31b (e.g., sprocket) around which the driving power transmission loop 7 is wrapped. The damper device 9 is configured to transmit the rotational driving power from the driving power transmission loop 7 to the axle 8 while absorbing an impact.

Figure 2:
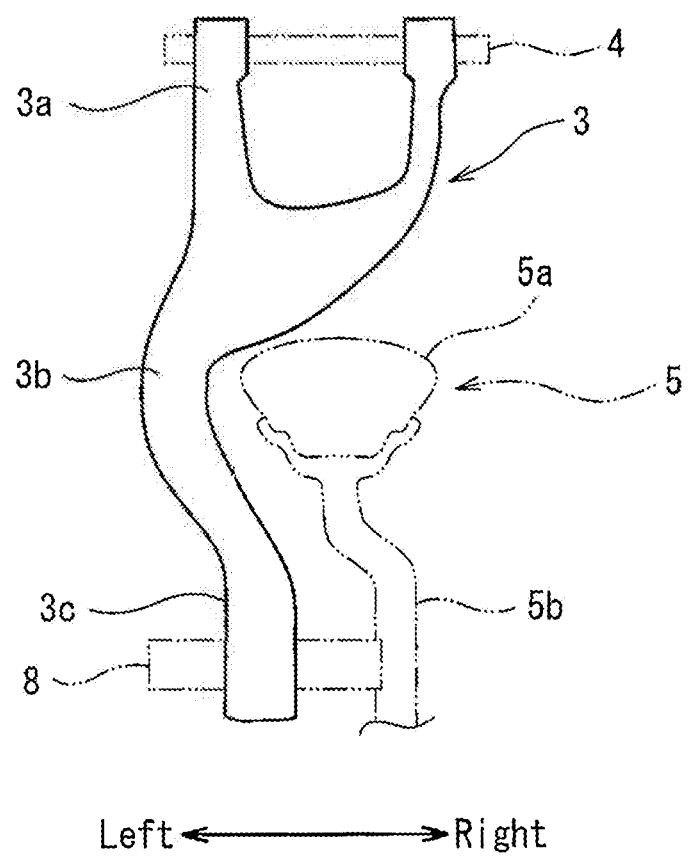
FIG. 2 is a plan view of a swing arm of the motorcycle of FIG. 1.

FIG. 2 is a plan view of the swing arm 3 of the motorcycle 1 of FIG. 1. As shown in FIG. 2, the swing arm 3 is a cantilever swing arm which extends through only one side (e.g., left side) of the rear wheel 5 and in which a rear end portion 3c thereof supports the center portion of the axle 8. A front end portion 3a of the swing arm 3 is located in front of the rear wheel 5. The front end portion 3a is branched into two parts in a substantially-U shape and supported by the pivot shaft 4 in such a manner that the swing arm 3 is angularly displaceable around the pivot shaft 4. An intermediate portion 3b of the swing arm 3 is located on a first side (e.g., left side) in a vehicle width direction, of a tire 5a of the rear wheel 5. In other words, the swing arm 3 does not extend through a second side (e.g., right side) in the vehicle width direction, of the rear wheel 5. A rear end portion 3c of the swing arm 3 is close to a wheel 5b of the rear wheel 5. The rear end portion 3c of the swing arm 3 supports the center portion of the axle 8. The swing arm 3 has a shape in which the intermediate portion 3b is curved and protrudes more outward in the vehicle width direction than the front end portion 3a and the rear end portion 3c.

Figure 3:
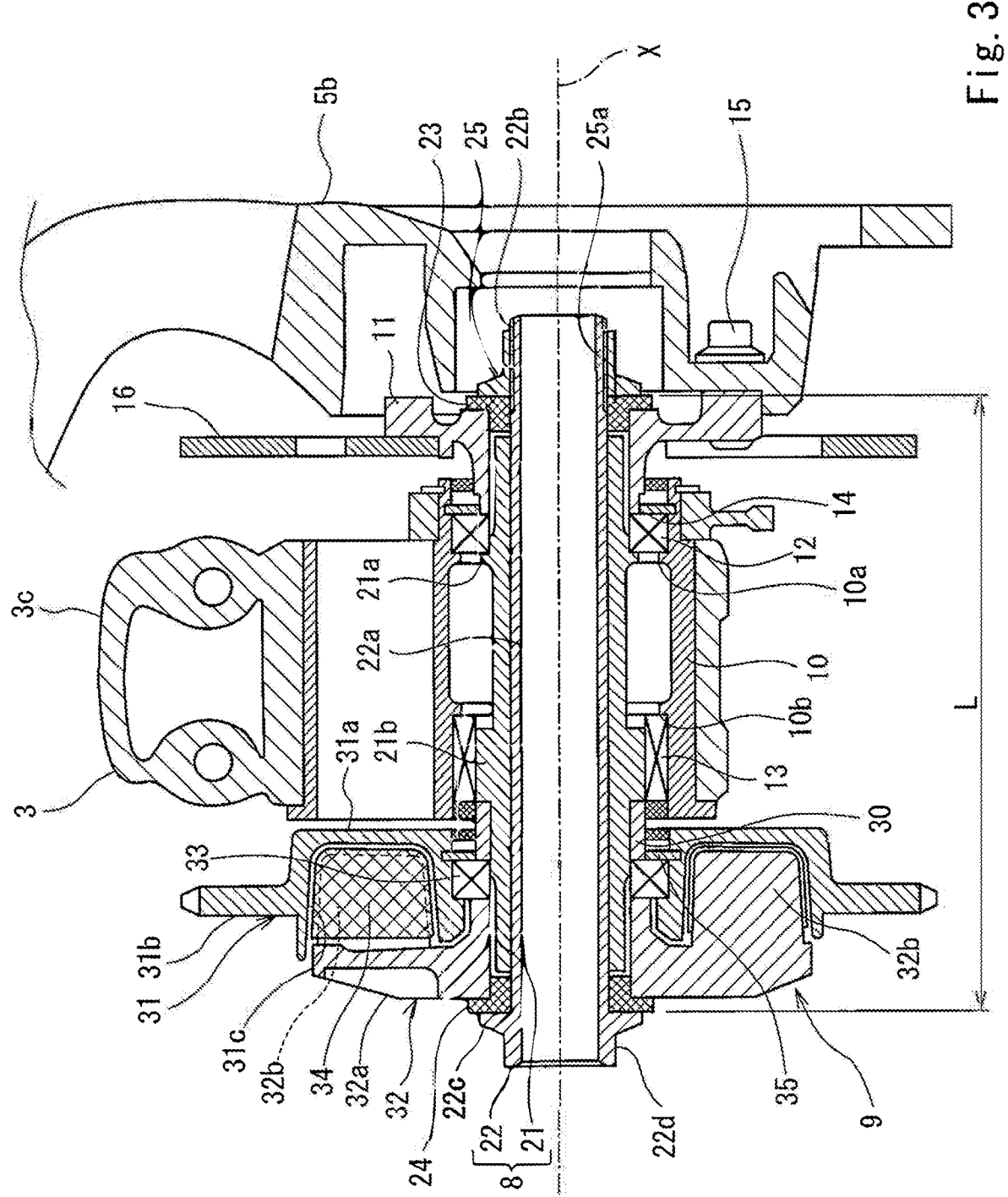
FIG. 3 is a cross-sectional view of major constituents, which is taken along an axle of a rear wheel of the motorcycle of FIG. 1.

FIG. 3 is a cross-sectional view of major constituents, which is taken along the axle 8 of the rear wheel 5 of the motorcycle 1 of FIG. 1. As shown in FIG. 3, the rear end portion 3c of the swing arm 3 supports the center portion of the axle 8 via an eccentric unit 10 in such a manner that the axle 8 is rotatable. The damper device 9 is spline-coupled to the axle 8 to transmit the driving power from the driving power transmission loop 7 to the axle 8. A wheel hub 11 of the rear wheel 5 is spline-coupled to the axle 8. In other words, the damper device 9, the eccentric unit 10, and the wheel hub 11 are externally fitted to the axle 8 as external members. The eccentric unit 10 is disposed at the center portion of the axle 8. The damper device 9 and the wheel hub 11 are disposed on both sides, respectively, of the eccentric unit 10, in an axis line X direction of the axle 8 (in the axial direction of the axle 8).

The axle 8 includes an outer tube member 21, and an inner shaft member 22 with a tubular shape which is inserted into the outer tube member 21. Thus, the axle 8 has a double-pipe structure. The inner shaft member 22 is rotatable relative to the outer tube member 21. The center portion of the outer tube member 21 is formed with protruding parts 21a, 21b protruding radially outward. A bearing 12 is in contact with the outer side surface in the axis line X direction, of the protruding part 21a, and is positioned. A bearing 13 is externally fitted to the outer peripheral surface of the protruding part 21b. The eccentric unit 10 supports the outer tube member 21 by the bearings 12, 13.

The eccentric unit 10 includes protruding parts 10a, 10b protruding radially inward from the inner peripheral surface of the eccentric unit 10. The outer race of the bearing 12 is in contact with the outer side surface in the axis line X direction, of the protruding part 10a. Thus, an inward displacement in the axis line X direction of the bearing 12 is inhibited. Likewise, the outer race of the bearing 13 is in contact with the outer side surface in the axis line X direction, of the protruding part 10b. Thus, an inward displacement in the axis line X direction of the bearing 13 is inhibited.

The wheel hub 11 is spline-coupled to the outer tube member 21, from an outer side in the axis line X direction. The inner tip end in the axis line X direction of the wheel hub 11 is in contact with the inner race of the bearing 12, and presses the bearing 12 toward the protruding part 10a. A circlip 14 is engaged with the eccentric unit 10, and is in contact with the outer side surface in the axis line X direction, of the outer race of the bearing 12. The wheel 5b is fastened to the wheel hub 11 by use of a fastening member 15. The outer tube member 21 is rotatable together with the rear wheel 5. A brake disc 16 is secured to the wheel hub 11.

The damper device 9 is mounted on the left portion of the outer tube member 21. The damper device 9 is configured to transmit the rotational driving power from the driving power transmission loop 7 (see FIG. 1) to the outer tube member 21 while absorbing an impact. The damper device 9 includes a first coupling member 31 to which the rotational driving power of the driving power transmission loop 7 is transmitted, a bearing 33 which supports the first coupling member 31 on the outer tube member 21 so that the first coupling member 31 is rotatable relative to the outer tube member 21, a second coupling member 32 which is elastically coupled to the first coupling member 31 and joined to the outer tube member 21 so that the second coupling member 32 is rotatable together with the outer tube member 21, and a plurality of buffering members 34 disposed between the first coupling member 31 and the second coupling member 32 to absorb an impact transmitted from the first coupling member 31 to the second coupling member 32. The buffering members 34 are elastic members made of rubber.

A cylindrical sleeve 30 is in contact with the outer side surface in the axis line X direction, of the protruding part 21b of the outer tube member 21. The bearing 33 is in contact with the outer side surface in the axis line X direction of the sleeve 30, and is positioned. The first coupling member 31 is externally fitted to the outer tube member 21 with the bearing 33 interposed therebetween. The first coupling member 31 includes an annular wall part 31a which is externally fitted to the bearing 33, a driven part 31b (e.g., sprocket) which protrudes radially outward from the outer peripheral surface of the annular wall part 31a and with which the driving power transmission loop 7 is engageable, and a plurality of depressed (recessed) parts 31c formed on the outer side surface of the annular wall part 31a such that the plurality of depressed parts 31c are spaced apart from each other in a circumferential direction.

The second coupling member 32 includes an annular wall part 32a which is spline-coupled to the outer tube member 21 from the outer side in the axis line X direction, and a plurality of protruding (convex) parts 32b which protrude from the annular wall part 32a toward the first coupling member 31 and are fittable to the plurality of depressed parts 31c, respectively. The plurality of buffering members 34 which are made of, for example, rubber, are accommodated in the depressed parts 31c, respectively. Each of the buffering members 34 is sandwiched in a driving power transmission direction (circumferential direction) between corresponding one of the plurality of depressed parts 31c of the first coupling member 31 and corresponding one of the plurality of protruding parts 32b of the second coupling member 32.

A circlip 35 is engaged with the first coupling member 31 and is in contact with the outer race of the bearing 33 from the inner side in the axis line X direction. The inner race of the bearing 33 is positioned from the inner side in the vehicle width direction, by the first protruding part 21b of the outer tube member 21 with the sleeve 30 interposed between the inner race of the bearing 33 and the first protruding part 21b. The outer race of the bearing 33 is positioned from the inner side in the vehicle width direction, by the first coupling member 31 with the circlip 35 interposed between the outer race of the bearing 33 and the first coupling member 31. The inner peripheral portion of the annular wall part 32a of the second coupling member 32 is in contact with the bearing 33 from the outer side in the axis line X direction, and presses the bearing 33 toward the protruding part 21b of the outer tube member 21.

The axle 8 has a structure in which the inner shaft member 22 is longer in the axis line X direction than the outer tube member 21. The inner shaft member 22 includes a cylindrical shaft part 22a which is internally fittable to the outer tube member 21, a male thread part 22b formed in the outer peripheral surface of the first end portion (right end portion of FIG. 3) of the shaft part 22a, a retaining part 22c protruding radially outward in a flange shape from the second end portion (left end portion of FIG. 3) of the shaft part 22a, and a protruding part 22d protruding outward in the axis line X direction from the retaining part 22c. The shaft part 22a, the male thread part 22b, the retaining part 22c, and the protruding part 22d are integrated. The cross-sectional outer shape of the protruding part 22d is a non-circular shape (e.g., polygon shape such as a hexagonal shape) so that a tool can be externally fitted to and engaged with the protruding part 22d. The entire inner peripheral surface of the inner shaft member 22 may be a cylindrical slide surface in the axis line X direction. The inner shaft member 22 is thinner than the outer tube member 21 (The inner shaft member 22 has a thickness smaller than that of the outer tube member 21). However, the inner shaft member 22 may have a thickness that is equal to or larger than that of the outer tube member 21. A fastening member 25 such as a nut has a female thread part 25a. The female thread part 25a of the fastening member 25 is fastened to the male thread part 22b of the inner shaft member 22 to prevent disengagement of the wheel hub 11 from the axle 8. The damper device 9 and the wheel hub 11 are tightened in the axis line X direction, between the fastening member 25 and the retaining part 22c of the inner shaft member 22.

The length in the axis line X direction, of the outer tube member 21, is smaller than a distance from the first end in the axis line X direction of the external member which is externally fitted to the axle 8 to the second end in the axis line X direction of the external member. More specifically, the length in the axis line X direction of the outer tube member 21 is smaller than a distance from the outer end (right end of FIG. 3) in the axis line X direction, of the wheel hub 11, to the outer end (left end of FIG. 3) in the axis line X direction, of the damper device 9. The first end edge in the axis line X direction, of the outer tube member 21, is located inward in the axis line X direction, relative to the outer end edge in the axis line X direction, of the wheel hub 11. The second end edge in the axis line X direction, of the outer tube member 21, is located inward in the axis line X direction, relative to the outer end edge in the axis line X direction, of the damper device 9.

On the first side (right side of FIG. 3) in the axis line X direction, of the outer tube member 21, a collar 23 is interposed between the wheel hub 11 and the inner shaft member 22. On the second side (left side of FIG. 3) in the axis line X direction, of the outer tube member 21, a collar 24 is interposed between the damper device 9 (second coupling member 32) and the inner shaft member 22. The pair of collars 23, 24 may be the same members.

Figure 4A:
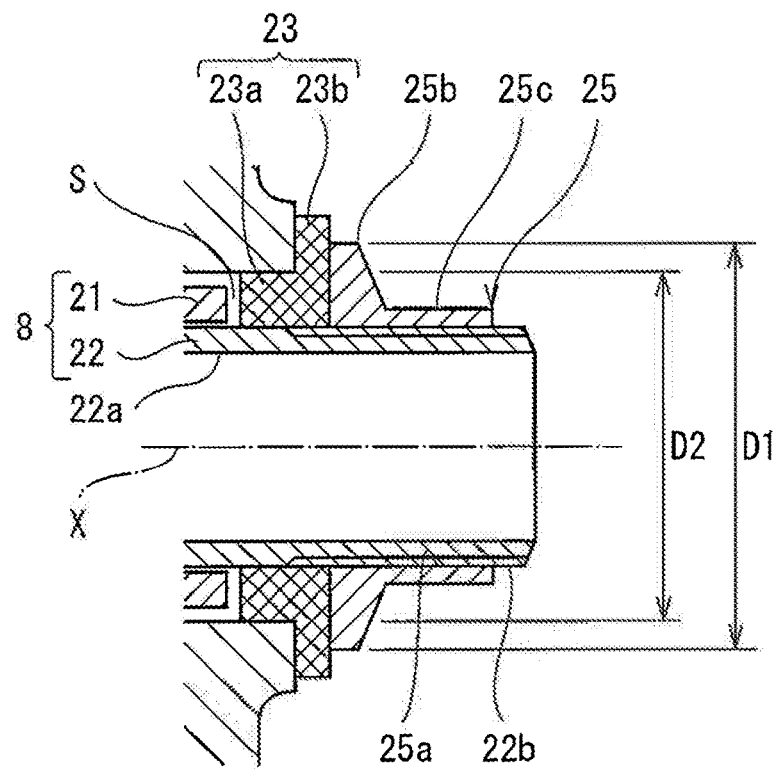
FIG. 4A is an enlarged view of the first end portion (right end portion) of the axle of FIG. 3.
Figure 4B:
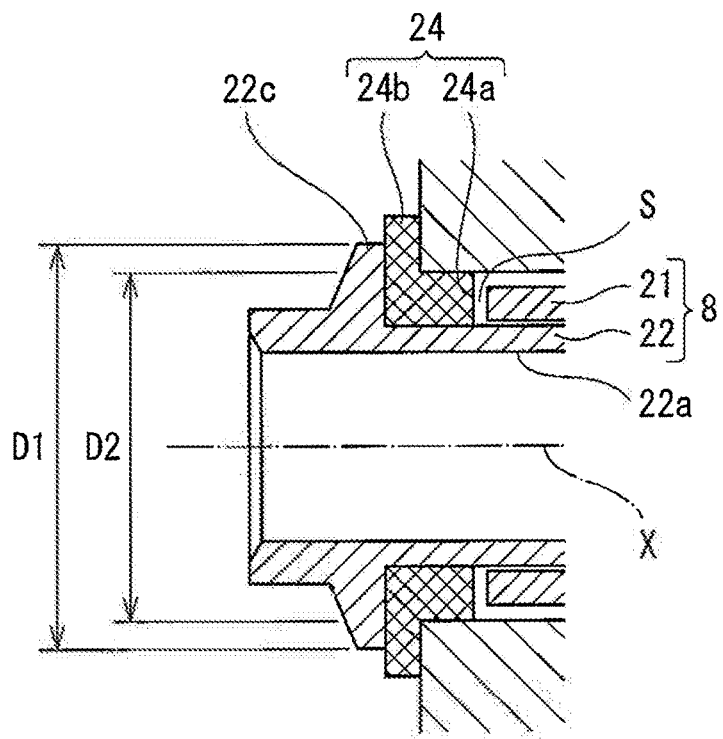
FIG. 4B is an enlarged view of the second end portion (left end portion) of the axle of FIG. 3.

FIG. 4A is an enlarged view of the first end portion (right end portion) of the axle 8 of FIG. 3. FIG. 4B is an enlarged view of the second end portion (left end portion) of the axle 8 of FIG. 3. As shown in FIG. 4A, at a location that is outward of the outer tube member 21 in the axis line X direction, the collar 23 includes a tubular part 23a located between the inner peripheral surface of the wheel hub 11 and the outer peripheral surface of the inner shaft member 22, and a flange part 23b protruding radially outward from the outer end portion in the axis line X direction, of the tubular part 23a. Likewise, as shown in FIG. 4B, at a location that is outward of the outer tube member 21 in the axis line X direction, the collar 24 includes a tubular part 24a located between the inner peripheral surface of the damper device 9 (second coupling member 32) and the outer peripheral surface of the inner shaft member 22, and a flange part 24b protruding radially outward from the outer end portion in the axis line X direction of the tubular part 24a.

The outer peripheral surface of the shaft part 22a of the inner shaft member 22 has a diameter that is slightly smaller than that of the inner peripheral surface of the outer tube member 21. With this structure, the inner shaft member 22 can be easily inserted into the outer tube member 21 during assembly. In this structure, the center axis of the inner shaft member 22 may be deviated from the center axis of the outer tube member 21. However, since the shaft part 22a of the inner shaft member 22 is sealingly fitted to the tubular parts 23a, 24a of the collars 23, 24 whose center axes conform to the center axis of the outer tube member 21. Therefore, the center axis of the inner shaft member 22 conforms to the center axis of the outer tube member 21 without a need to sealingly fit the inner shaft member 22 to the outer tube member 21.

The inner peripheral surface of the fastening member 25 is formed with the female thread part 25a. For example, the fastening member 25 includes a nut part 25b, and a tubular part 25c protruding outward in the axis line X direction from the inner peripheral end portion of the nut part 25b. The tubular part 25c and the inner shaft member 22 may be radially penetrated by a looseness prevention pin (not shown). In a state in which the fastening member 25 is fastened to the male thread part 22b of the inner shaft member 22, the retaining part 22c retains the axial tension of the inner shaft member 22 from a side opposite to the fastening member 25, and the fastening member 25 and the retaining part 22c press the flange parts 23b, 24b of the collars 23, 24, respectively, from the outer side in the axis line X direction. In other words, the collars 23, 24 also serve as washers for the fastening member 25 and the retaining part 22c.

In a state in which the fastening member 25 and the retaining part 22c press the flange parts 23b, 24b of the collars 23, 24, respectively, the tubular parts 23a, 24a of the collars 23, 24 are spaced apart with clearances (gaps) S for a tolerance from the outer tube member 21 in the axis line X direction. An outer diameter D1 of each of the fastening member 25 and the retaining part 22c is larger than an outer diameter D2 of each of the tubular parts 23a, 24a of the collars 23, 24. In this structure, a pressing force in the axis line X direction which is applied by the fastening member 25 is received by the wheel hub 11 via the flange part 23b. In addition, a reaction force in the axis line X direction which is applied by the retaining part 22c is received by the damper device 9 (second coupling member 32) via the flange part 24b. Therefore, even in a case where the clearances S for the tolerance are provided between the tubular parts 23a, 24a of the collars 23, 24 and the outer tube member 21 in the axis line X direction, it becomes possible to prevent a situation in which the collars 23, 24 are deformed and the tubular parts 23a, 24a are moved to eliminate the clearances S In accordance with the above-described configuration, in a case where the external members (the eccentric unit 10, the wheel hub 11, and the damper device 9) which are externally fitted to the axle 8 are retained and tightened between the retaining part 22c of the inner shaft member 22 and the fastening member 25, a fastening distance L (see FIG. 3) between the retaining part 22c and the fastening member 25 is longer in the axis line X direction than the length of the outer tube member 21. In this structure, it becomes possible to secure a sufficient space in (distance over) which the inner shaft member 22 can be elastically extended and contracted in the axis line X direction, by the fastening force generated between the retaining part 22c of the inner shaft member 22 and the fastening member 25 (it becomes possible to secure a sufficient elastic extension/contraction capability of the inner shaft member 22 in the axis line X direction, which occurs by the fastening force generated between the retaining part 22c and the fastening member 25). The axial tension generated in the inner shaft member 22 by fastening the fastening member 25 to the axle 8 is easily maintained by the sufficient elastic extension/contraction. As a result, it becomes possible to prevent the fastening member 25 from getting loose from the axle 8. Since the axle 8 includes separate members which are the outer tube member 21 having a driving power transmission function and the inner shaft member 22 having a fastening function, it becomes possible to prevent the looseness of the fastening member 25 fastened to the axle 8 supported by the cantilever swing arm 3, at low cost.

The inner shaft member 22 with the tubular shape is more easily elastically extended and contracted in the axis line X direction, than an inner shaft member with a solid structure. The inner shaft member 22 with the tubular shape makes it possible to easily generate the axial tension by fastening the fastening member 25 to the axle 8. Thus, it becomes possible to suitably prevent the fastening member 25 from getting loose. Since the thickness of the inner shaft member 22 is smaller than that of the outer tube member 21, the axial tension of the inner shaft member 22 is easily generated by fastening the fastening member 25 to the axle 8, while maintaining a sufficient strength of the outer tube member 21 with respect to a rotation. In this way, the strength of the axle 8 and prevention of the looseness of the fastening member 25 can be achieved.

The present invention is not limited to the above-described embodiment, and the configuration may be changed, added or deleted. For example, although in the above-described embodiment, the wheel hub 11 is separate from the outer tube member 21, the wheel hub 11 may be integrated with the outer tube member 21. The inner shaft member 22 may be a solid rod. The outer tube member 21 and the inner shaft member 22 may be made of materials different from each other. For example, the inner shaft member 22 may be made of a material with a Young's modulus in the axis line X direction that is higher than that of a material of the outer tube member 21.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

What is claimed is:

1. A straddle vehicle comprising:
an axle of a drive wheel;
an external member which is externally fittable to the axle; and
a fastening member having a female thread part fastened to the axle to prevent disengagement of the external member from the axle,
wherein the axle includes an outer tube member to which the external member is externally fittable, and an inner shaft member which is inserted into the outer tube member and is longer in an axial direction of the axle than the outer tube member, the outer tube member being rotatable together with the drive wheel,
wherein the inner shaft member includes:
a shaft part which is internally fittable to the outer tube member,
a male thread part formed in an outer peripheral surface of a first end portion of the shaft part, the first end portion protruding to a first side in the axial direction from the outer tube member, the female thread part of the fastening member being fastened to the male thread part, and
a retaining part protruding radially outward from a second end portion of the shaft part, the second end portion protruding to a second side in the axial direction from the outer tube member, the retaining part being configured to retain an axial tension of the inner shaft member which is generated by fastening the fastening member to the axle.

2. The straddle vehicle according to claim 1,
wherein the inner shaft member has a tubular shape.

3. The straddle vehicle according to claim 2,
wherein the inner shaft member has a thickness smaller than a thickness of the outer tube member.

4. A straddle vehicle comprising:
an axle of a drive wheel;
an external member which is externally fittable to the axle;
a fastening member having a female thread part fastened to the axle to prevent disengagement of the external member from the axle; and
a pair of collars,
wherein the axle includes an outer tube member to which the external member is externally fittable, and an inner shaft member which is inserted into the outer tube member and is longer in an axial direction of the axle than the outer tube member,
wherein the inner shaft member includes:
a shaft part which is internally fittable to the outer tube member,
a male thread part formed in an outer peripheral surface of a first end portion of the shaft part, the first end portion protruding to a first side in the axial direction from the outer tube member, the female thread part of the fastening member being fastened to the male thread part, and
a retaining part protruding radially outward from a second end portion of the shaft part, the second end portion protruding to a second side in the axial direction from the outer tube member, the retaining part being configured to retain an axial tension of the inner shaft member which is generated by fastening the fastening member to the axle,
wherein the pair of collars is disposed between the external member and the inner shaft member,
wherein two opposite ends of the outer tube member in the axial direction are located inward in the axial direction relative to two opposite ends in the axial direction, respectively, of the external member, and
wherein at a location that is outward of the outer tube member in the axial direction, each of the pair of collars includes a tubular part located between an inner peripheral surface of the external member and an outer peripheral surface of the inner shaft member.

5. The straddle vehicle according to claim 4,
wherein each of the pair of collars further includes a flange part protruding radially more outward than the inner peripheral surface of the external member, and
wherein the retaining part of the inner shaft member and the fastening member press flange parts of the pair of collars, respectively, from an outer side in the axial direction.

6. The straddle vehicle according to claim 5,
wherein in a state in which the retaining part of the inner shaft member and the fastening member press the flange parts of the pair of collars, respectively, a clearance is formed between the tubular part of each of the pair of collars and the outer tube member in the axial direction, and
wherein each of the retaining part and the fastening member has an outer diameter larger than an outer diameter of the tubular part of each of the pair of collars.

7. The straddle vehicle according to claim 1, wherein the shaft part, the male thread part and the retaining part of the inner shaft member are integrally formed.

* * * * *